(12) United States Patent
Beber et al.

(10) Patent No.: US 9,655,474 B2
(45) Date of Patent: *May 23, 2017

(54) FOOD PROCESSING DEVICE WITH AN EXTERNALLY OPERATED ADJUSTMENT MECHANISM

(75) Inventors: Kevin James Beber, Granger, IN (US); David J. Gushwa, Mishawaka, IN (US); Yung Leong Hin, Tuen Mun (HK); Jeffrey Carl Loebig, New Territories (HK); Euan Skinner Macleod, New Territories (HK); Qu Zhi Jie, Ji An (CN)

(73) Assignee: Whirlpool Corporation, Benton Harbor, MI (US)

( * ) Notice: Subject to any disclaimer, the term of this patent is extended or adjusted under 35 U.S.C. 154(b) by 737 days.

This patent is subject to a terminal disclaimer.

(21) Appl. No.: 14/000,413

(22) PCT Filed: Feb. 25, 2011

(86) PCT No.: PCT/CN2011/000311
§ 371 (c)(1),
(2), (4) Date: Sep. 23, 2013

(87) PCT Pub. No.: WO2012/113106
PCT Pub. Date: Aug. 30, 2012

(65) Prior Publication Data
US 2014/0077012 A1    Mar. 20, 2014

(51) Int. Cl.
*A47J 43/046* (2006.01)
*A47J 43/07* (2006.01)
(Continued)

(52) U.S. Cl.
CPC ......... *A47J 43/0722* (2013.01); *A47J 43/046* (2013.01); *A47J 43/085* (2013.01); *A47J 43/04* (2013.01)

(58) Field of Classification Search
CPC .... A47J 43/0722; A47J 43/046; A47J 43/085; A47J 43/04
(Continued)

(56) References Cited

U.S. PATENT DOCUMENTS 2,189,199 A    2/1940 Criner
2,480,717 A    8/1949 Dodegge
(Continued)

FOREIGN PATENT DOCUMENTS

CN    1115128 C    7/2003
CN    1575716 A    2/2005
(Continued)

OTHER PUBLICATIONS

European Patent Application No. 11859075.1, filing date PCT, Feb. 25, 2011, national phase entry EP Aug. 23, 2013, Applicant: Whirlpool Corporation, European Search Report re: same, mail date Jul. 30, 2014.

(Continued)

*Primary Examiner* — Mark Rosenbaum
(74) *Attorney, Agent, or Firm* — Price Heneveld LLP

(57) ABSTRACT

A food processor includes a base and a bowl with a removable lid. Food items are advanced into the bowl through a feed tube formed in the lid where they are cut by a cutting assembly driven by a motor. The cutting assembly is adjustable to vary the thickness of the cut food items. An adjustment assembly positioned in the base is operable to adjust the cutting thickness of the cutting assembly while the cutting assembly is driven by the motor.

20 Claims, 7 Drawing Sheets

(51) Int. Cl.
*A47J 43/08* (2006.01)
*A47J 43/04* (2006.01)

(58) Field of Classification Search
USPC .......................................................... 241/92
See application file for complete search history.

(56) References Cited

U.S. PATENT DOCUMENTS

| | | | |
|---|---|---|---|
| 3,199,860 | A | 8/1965 | Moberg |
| 3,623,525 | A | 11/1971 | Kieves |
| 3,704,736 | A | 12/1972 | Pratley |
| 3,784,118 | A | 1/1974 | Hurwitz |
| 4,190,208 | A | 2/1980 | Schaeffer et al. |
| 4,369,680 | A | 1/1983 | Williams |
| 4,560,111 | A | 12/1985 | Cavalli |
| 4,570,519 | A | 2/1986 | Motosko, II |
| 4,624,166 | A | 11/1986 | Kreth et al. |
| 4,688,478 | A | 8/1987 | Williams |
| 4,706,896 | A | 11/1987 | Moon-Kau |
| 4,733,589 | A | 3/1988 | Wolff |
| 4,818,116 | A | 4/1989 | Pardo |
| 4,819,882 | A | 4/1989 | Stottmann et al. |
| 4,877,191 | A | 10/1989 | Golob et al. |
| 4,998,677 | A | 3/1991 | Gallaher |
| 5,009,510 | A | 4/1991 | Gabriele |
| 5,037,033 | A | 8/1991 | Stottmann et al. |
| 5,046,252 | A | 9/1991 | Ayuta et al. |
| 5,197,681 | A | 3/1993 | Liebermann |
| 5,577,430 | A | 11/1996 | Gunderson et al. |
| 6,254,019 | B1 | 7/2001 | Galbreath |
| 6,315,226 | B1 | 11/2001 | Trick et al. |
| 7,322,112 | B2 | 1/2008 | Boemer |
| 7,328,864 | B2 | 2/2008 | Narai et al. |
| 7,681,817 | B2 | 3/2010 | Orent |
| 7,694,615 | B2 | 4/2010 | DiPietro |
| D644,478 | S | 9/2011 | Czach |
| D644,480 | S | 9/2011 | Czach et al. |
| 9,049,965 | B2 * | 6/2015 | Beber ................. A47J 43/0716 |
| 2006/0075872 | A1 | 4/2006 | Wangler |
| 2006/0150791 | A1 | 7/2006 | Chase et al. |
| 2007/0044621 | A1 | 3/2007 | Rote et al. |
| 2007/0209528 | A1 | 9/2007 | Chang |
| 2007/0261523 | A1 | 11/2007 | Hussey et al. |
| 2008/0115677 | A1 | 5/2008 | Tseng |
| 2008/0156913 | A1 | 7/2008 | Orent |
| 2008/0163768 | A1 | 7/2008 | Glucksman et al. |
| 2009/0139383 | A1 | 6/2009 | Tsai |
| 2009/0158941 | A1 | 6/2009 | Lee |
| 2009/0301319 | A1 | 12/2009 | Bigge et al. |
| 2009/0314168 | A1 | 12/2009 | Krasznai |
| 2011/0139017 | A1 | 6/2011 | Beber et al. |
| 2011/0265664 | A1 | 11/2011 | Goncalves et al. |
| 2014/0014752 | A1 * | 1/2014 | Beber ................. A47J 43/0722 241/100 |

FOREIGN PATENT DOCUMENTS

| | | |
|---|---|---|
| CN | 1656989 A | 8/2005 |
| CN | 201101452 Y | 8/2008 |
| CN | 101496699 B | 12/2011 |
| DE | 2116675 A1 | 10/1971 |
| DE | 3644267 A1 | 7/1988 |
| DE | 202004012729 U1 | 2/2005 |
| EP | 010075 A2 | 2/1984 |
| EP | 0244016 A1 | 11/1987 |
| FR | 2500737 A1 | 9/1982 |
| FR | 2582497 | 12/1986 |
| FR | 2582497 A1 | 12/1986 |
| FR | 2602660 | 2/1988 |
| FR | 2646074 A1 | 10/1990 |
| FR | 2862199 A1 | 5/2005 |
| GB | 1264448 | 2/1972 |
| GB | 2075626 A | 11/1981 |
| JP | 1153123 A | 6/1989 |
| JP | 1299522 A | 12/1989 |
| JP | 4099551 A | 3/1992 |
| JP | 4099552 A | 3/1992 |
| KR | 200911969 U | 11/2009 |
| WO | 0019878 A1 | 4/2000 |
| WO | 0221986 A1 | 3/2002 |
| WO | 0230253 A1 | 4/2002 |
| WO | 03057355 A1 | 7/2003 |
| WO | 2006128221 A1 | 12/2006 |
| WO | 2009076585 A1 | 6/2009 |

OTHER PUBLICATIONS

European Patent Application No. 11859310.2, filing date PCT, Sep. 1, 2011, national phase entry EP Aug. 23, 2013, Applicant: Whirlpool Corporation, European Search Report re: same, mail date Jun. 27, 2014.
European Patent Application No. 11859159.3, filing date PCT, Feb. 25, 2011, national phase entry EP Aug. 23, 2013, Applicant: Whirlpool Corporation, European Search Report re: same, mail date Jun. 27, 2014.
International Application No. PCT/CN201001487, filed Sep. 1, 2011, published as WO2012113125A1 on Aug. 30, 2012, Title "A Food Processing Device with an Externally Operated Adjustment Mechanism", Applicant: Whirlpool Corporation.
International Application No. PCT/CN201001487, filed Sep. 1, 2011, published as WO2012113125A1 on Aug. 30, 2012, Title A Food Processing Device with an Externally Operated Adjustment Mechanism, Applicant: Whirlpool Corporation. Written Opinion of the International Search Authority with a mail date of Dec. 8, 2011.
International Application No. PCT/CN2011000311, filed Feb. 25, 2011, published as WO2012113106A1 on Aug. 30, 2012, Title "A Food Processing Device with an Externally Operated Adjustment Mechanism", Applicant: Whirlpool Corporation.
International Application No. PCT/CN2011000311, filed Feb. 25, 2011, published as WO2012113106A1 on Aug. 30, 2012, Title "A Food Processing Device with an Externally Operated Adjustment Mechanism", Applicant: Whirlpool Corporation. Written Opinion of the International Search Authority with a mail date of Nov. 17, 2011.
Wolfgang Puck Professional Series 12-cup Food Processor Use and Care, Jul. 3, 2007, GP. 1-23, W. P. Appliances, Inc. Model WPMFP20C, Rev 1.0, downloaded from: tscdist_foodprocmanual on Apr. 12, 2010.
Ellie; Home Cooking in Montana: Product Review . . . Cuisinart Elite 12 cup Food Processor Model FP-12DC; Mar. 30, 2012; 17 pages.
International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation.
International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation. Written Opinion of the International Search Authority with a mail date of Dec. 1, 2011.

* cited by examiner

FOOD PROCESSING DEVICE WITH AN EXTERNALLY OPERATED ADJUSTMENT MECHANISM

CROSS-REFERENCE TO RELATED U.S. PATENT APPLICATIONS

Cross-reference is made to co-pending U.S. patent application Ser. No. 12/634,766 entitled "FOOD PROCESSOR WITH AN EXTERNAL CONTROL FOR ADJUSTING CUTTING THICKNESS," which was filed by Michael P. Conti et al. on Dec. 10, 2009, and U.S. Design patent application Ser. No. 29/386,182 entitled "Food Processor," which was filed by Matthew Czach on Feb. 25, 2011, each of which is assigned to the same assignee as the present application and each of which is hereby incorporated by reference.

TECHNICAL FIELD

The present disclosure relates generally to a domestic food processing device, and, more particularly, to a food processing device having a control for adjusting the cutting thickness of the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collect in the bottom of the bowl. Some food processors also include an outlet on the bowl that guides the processed pieces of food into an outside bin, container, or other bowl.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that processed pieces of food cut by the blade fall through the aperture.

SUMMARY

According to one aspect of the disclosure, a food processor includes a base having a motor positioned therein, a removable bowl coupled to the base, and a removable lid coupled to the bowl so as to define a processing chamber. The removable lid has a feed tube that opens into the bowl. The food processor also includes a cutting assembly positioned in the processing chamber that is driven by the motor to cut food items advanced through the feed tube. The cutting assembly is positionable between a plurality of cutting positions to produce cut food items of varying thicknesses. The food processor also includes an adjustment assembly positioned in the base. The adjustment assembly includes a first sleeve secured to the base, a second sleeve rotatively coupled to the first sleeve, and a user-operated control device operable to rotate the second sleeve relative to the first sleeve to move the cutting assembly between the plurality of cutting positions. In some embodiments, the first sleeve may have an externally-threaded body, and the second sleeve may have an internally-threaded body positioned over the externally-threaded body of the first sleeve.

In some embodiments, the cutting assembly may include a cutting blade and a rotating disk that may be supported by the second sleeve. In some embodiments, rotation of the second sleeve in a first direction may cause upward movement of the second sleeve and the rotating disk relative to the cutting blade, and rotation of the second sleeve in a second direction may cause downward movement of the second sleeve and the rotating disk relative to the cutting blade.

Additionally, in some embodiments, the food processor may further include a drive shaft connected at a first end to the motor and at a second end to the cutting assembly to transmit a driving force from the motor to the cutting assembly. In some embodiments, the first sleeve may include a bearing rotatively supporting the drive shaft, and the drive shaft may extend through an opening defined in the second sleeve. The opening may be sized such that the drive shaft does not contact the second sleeve.

In some embodiments, the food processor may further include a first adaptor removably coupled to the rotating disk, and a second adaptor secured to a lower end of the first adaptor. The second sleeve may include a bearing rotatively supporting the second adaptor. In some embodiments, the lower end of the first adaptor may include a first plurality of teeth, and the second adaptor may include a second plurality of teeth interdigitated with the first plurality of teeth to secure the second adaptor to the first adaptor.

Additionally, in some embodiments, the adjustment assembly may further comprise a gear assembly positioned in the base and coupled to the second sleeve. The gear assembly may be operable to rotate the second sleeve relative to the first sleeve. The user-operated control device may be coupled to the gear assembly and be configured to operate the gear assembly such that the second sleeve is rotated relative to the first sleeve to move the cutting assembly between the plurality of cutting positions.

In some embodiments, the second sleeve may have a groove defined therein. The gear assembly may have a first gear including a first plurality of teeth defined on an outer surface and a spline extending from an inner surface thereof. The spline may be received in the groove of the second sleeve. A second gear including a second plurality of teeth may be interdigitated with the first plurality of teeth. The user-operated control device may cause rotation of the second gear and the first gear.

In some embodiments, the user-operated control device may include a lever extending outwardly from the base and positionable between a plurality of adjustment positions relative to the base. The lever may be coupled to the second gear such that movement of the lever between the plurality of adjustment positions device may cause rotation of the second sleeve relative to the first sleeve to move the cutting assembly between the plurality of cutting positions.

In some embodiments, the food processor may further include a locking mechanism to inhibit movement of the lever. Additionally, in some embodiments, the locking mechanism may include a plurality of notches formed in the second gear, and each notch may correspond to one of the plurality of adjustment positions. The locking mechanism may also include a pin positioned below the second gear that is configured to be received in each of the plurality of notches, and a spring coupled to the pin. The spring may bias the pin into the notch corresponding to a present adjustment position of the lever to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. The food processor also includes a cutting assembly, which is positioned in the processing chamber and driven by the motor to cut food items advanced through the feed tube. The cutting assembly includes a cutting blade and a rotating disk having an upper surface. The rotating disk is upwardly and downwardly moveable relative to the cutting blade to adjust the distance between the upper surface of the rotating disk and the cutting blade. The food processor also has an adjustment assembly including a screw-type drive assembly positioned in the base. The screw-type drive assembly is operable to move the rotating disk relative to the cutting blade while the rotating disk and the cutting assembly is driven by the motor.

In some embodiments, the screw-type drive assembly may support the rotating disk. Rotation of the screw-type drive assembly in a first direction may cause upward movement of the rotating disk, and rotation of the screw-type drive assembly in a second direction may cause downward movement of the rotating disk.

In some embodiments, the screw-type drive assembly may include an externally-threaded first sleeve and an internally-threaded second sleeve positioned over the first sleeve. The rotating disk may be supported by the second sleeve such that rotation of the second sleeve in the first direction nay cause upward movement of the second sleeve and the rotating disk and rotation of the second sleeve in the second direction may cause downward movement of the second sleeve and the rotating disk.

In some embodiments, the adjustment assembly may further include a gear assembly positioned in the base and coupled to the second sleeve. The gear assembly may be configured to rotate the second sleeve relative to the first sleeve. Additionally, in some embodiments, the adjustment assembly may further include a lever coupled to the screw-type drive assembly. The lever may extend outwardly from the base and be moveable relative to the base, and movement of the lever may cause the screw-type drive assembly to move the rotating disk relative to the cutting blade. In some embodiments, the food processor may include a locking mechanism to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. A cutting assembly is positioned in the processing chamber and driven by the motor to cut food items advanced through the feed tube. The cutting assembly is positionable between a plurality of cutting positions to produce cut food items of varying thicknesses. An adjustment assembly is positioned in the base that is operable to move the cutting assembly between the plurality of cutting positions while the cutting assembly is driven by the motor.

In some embodiments, the adjustment assembly may include a lever extending outwardly from the base. The lever may be positionable between a plurality of adjustment positions corresponding to the plurality of cutting positions of the cutting assembly such that movement of the lever between the plurality of adjustment positions moves the cutting assembly between the plurality of cutting positions. In some embodiments, the adjustment assembly may include a screw-type drive assembly operable to move the cutting assembly between the plurality of cutting positions, and a second motor rotatively coupled to the screw-type drive assembly. The second motor may be configured to operate the screw-type drive assembly to move the cutting assembly between the plurality of cutting positions when the second motor is energized.

BRIEF DESCRIPTION OF THE DRAWINGS

The detailed description particularly refers to the following figures, in which.

DETAILED DESCRIPTION OF THE DRAWINGS

Figure 1:
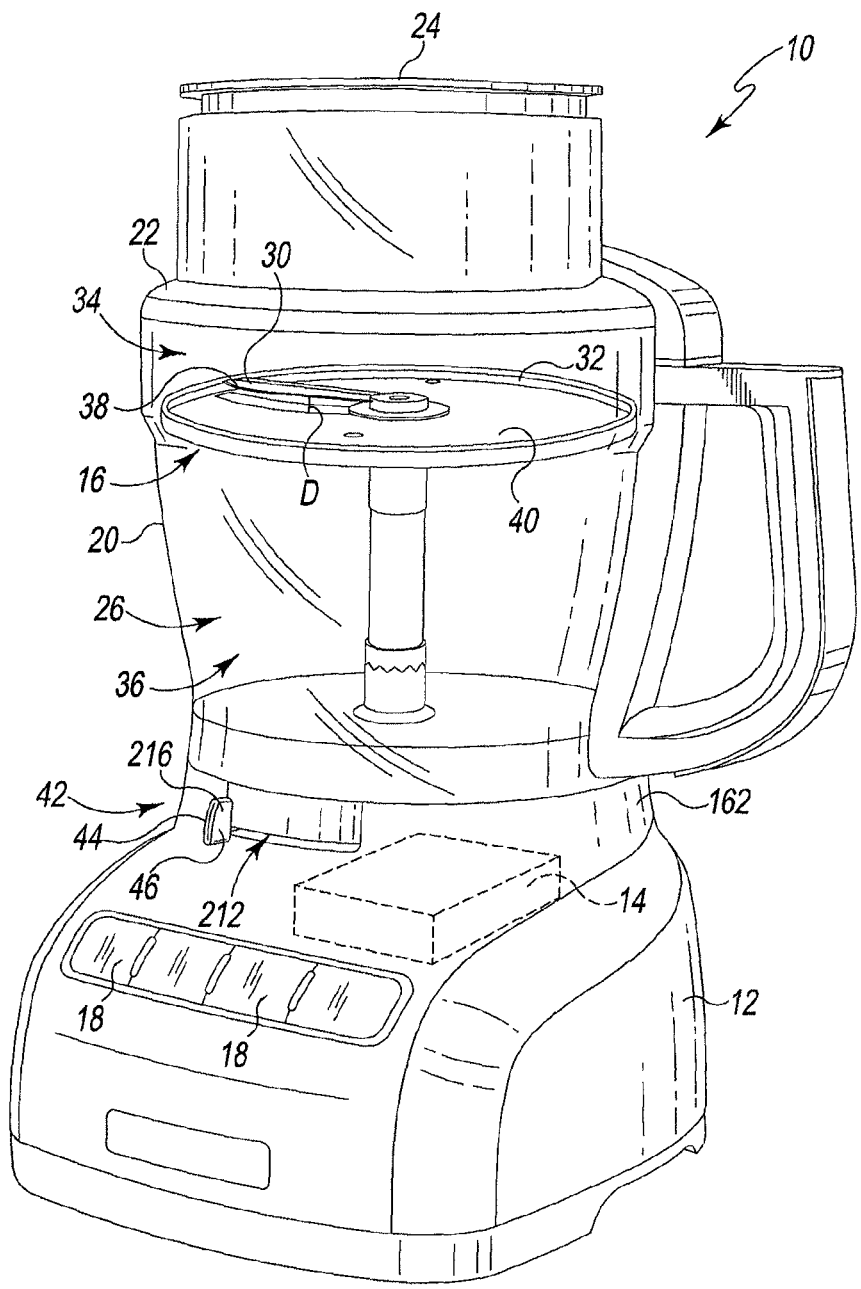
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a food processing device or food processor 10 is shown. The food processor 10 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 10. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable receptacle or bowl 20 is secured to the base 12. The bowl's handle facilitates placement of the bowl 20 on the base 12. The bowl 20 includes a removable lid 22 secured to its upper peripheral edge. The lid 22 has a feed tube 24 formed thereon through which food items such as fruits and vegetables are inserted into the bowl 20 to be processed by the food processor 10. Collectively, the lid 22 and the bowl 20 define a processing chamber 26 where food items are processed by the cutting assembly 16.

The bowl 20, lid 22, and feed tube 24 are generally made of a transparent or translucent plastic material so that the contents of the food processor 10 can be viewed by a user without removing the lid 22 from the bowl 20. Moreover, one or more locking mechanisms may be used to lock the bowl to the base 12 and the lid 22 to the bowl 20.

As shown in FIG. 1, the cutting assembly 16 includes a cutting blade 30 and a rotating disk 32, which effectively divides the processing chamber 26 into an upper compartment 34 located between the disk 32 and the lid 22, and a lower compartment 36 located underneath the disk 32. A vertical distance, D, between the cutting edge 38 of the cutting blade 30 and the upper surface 40 of the rotating disk 32 defines a cutting thickness of food items processed by the cutting assembly 16. In other words, the thickness of the pieces of food items cut by the food processor 10 is determined by the distance D between the cutting edge 38 of the cutting blade 30 and the upper surface 40 of the rotating disk 32. As the distance D between the cutting edge 38 of the cutting blade 30 and the upper surface 40 of the rotating disk 32 increases, thicker pieces of food items are created; while thinner pieces of food items are created when the distance D between the cutting edge 38 of the cutting blade 30 and the upper surface 40 of the rotating disk 32 decreases. The cutting assembly 16 has a number of cutting positions in which the distance D between the cutting edge 38 of the cutting blade 30 and the upper surface 40 of the rotating disk 32 is preset.

A thickness adjustment assembly 42 is operable by a user to vary the cutting thickness of the food processor 10 while the cutting assembly 16 is driven by the motor 14, thereby creating thicker or thinner pieces of cut food items during a cutting operation. The adjustment assembly 42 includes a user-operated control device 44 that is located outside of the processing chamber 26 defined by the bowl 20 and the lid 22. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting assembly 16 is driven by the motor 14.

For example, in the illustrative embodiment described herein, the external control device 44 is embodied as a control lever 46 that extends outwardly from the base 12 and is moveable relative to the base 12 to change the cutting thickness of the cutting assembly 16 without removing the lid 22 from the bowl 20. In such a configuration, the user moves the control lever 46 one direction or the other to change (i.e., increase or decrease) the distance D between the cutting edge 38 of the cutting blade 30 and the upper surface 40 of the rotating disk 32. It should be appreciated that other user-operated control devices, such as knobs, dials, buttons, servo-motors, or the like, may be substituted for the control lever 46.

Figure 2:
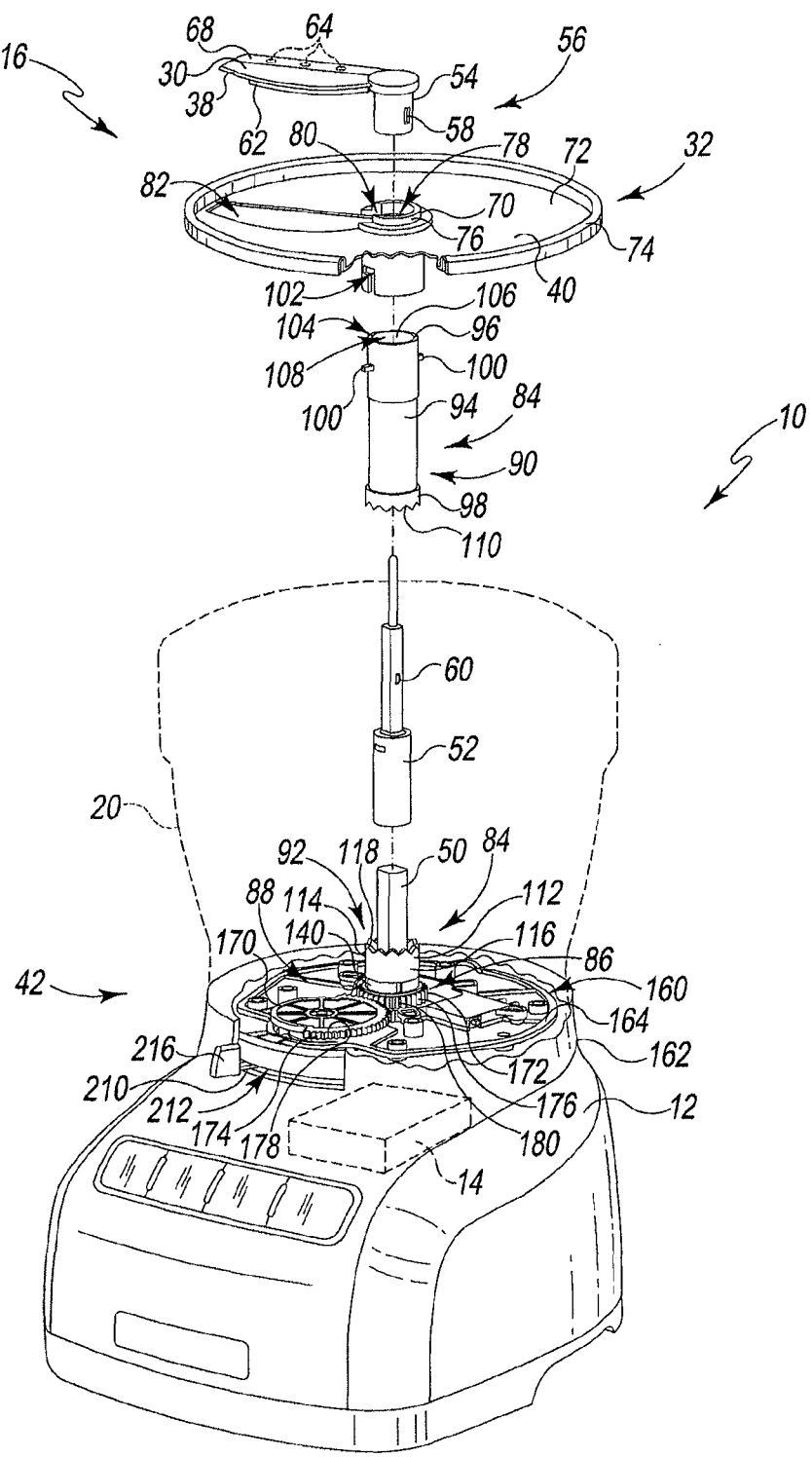
FIG. 2 is an exploded, partial cross-sectional perspective view of the food processor of FIG. 1.
Figure 3:
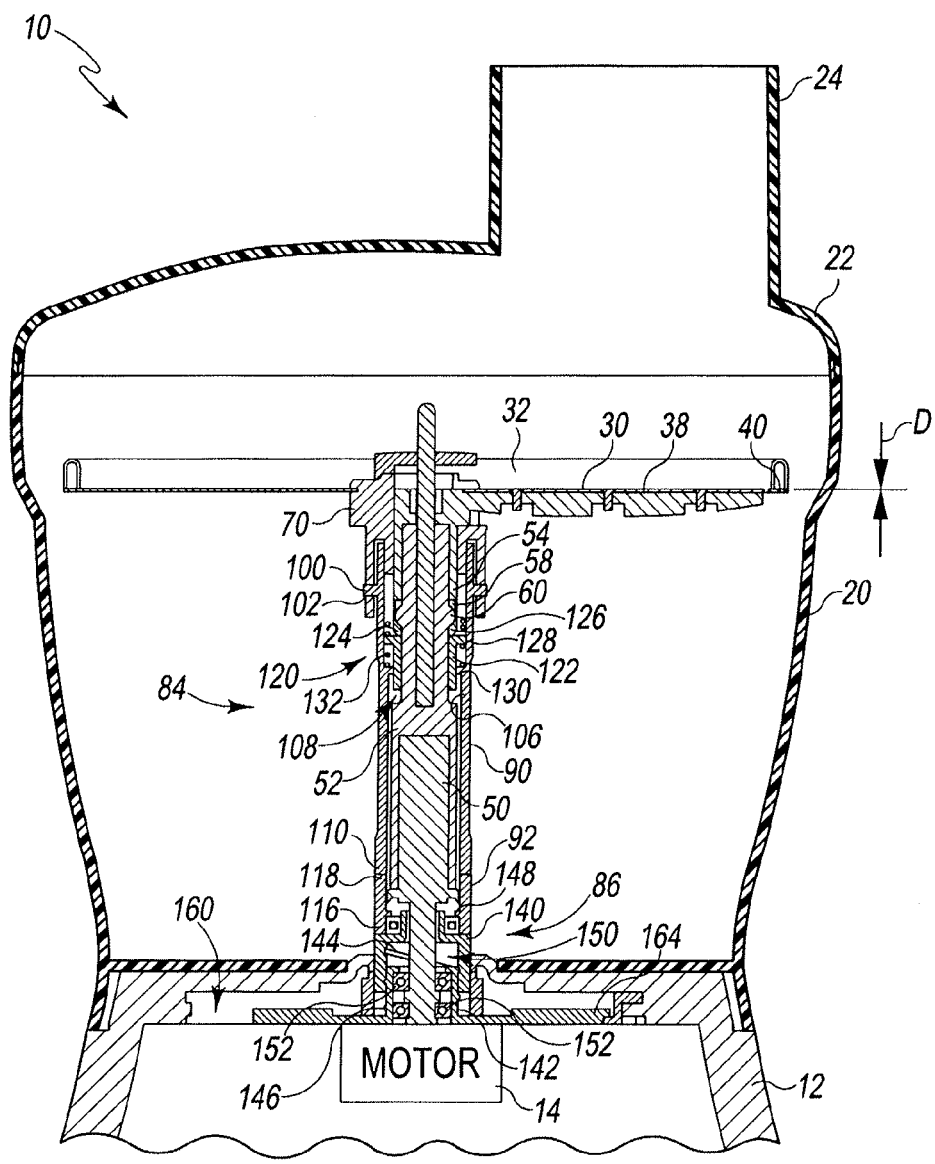
FIG. 3 is a partial cross-sectional side elevation view of the food processor of FIG. 1 showing a cutting assembly that includes a rotating disk and a cutting blade.
Figure 4:
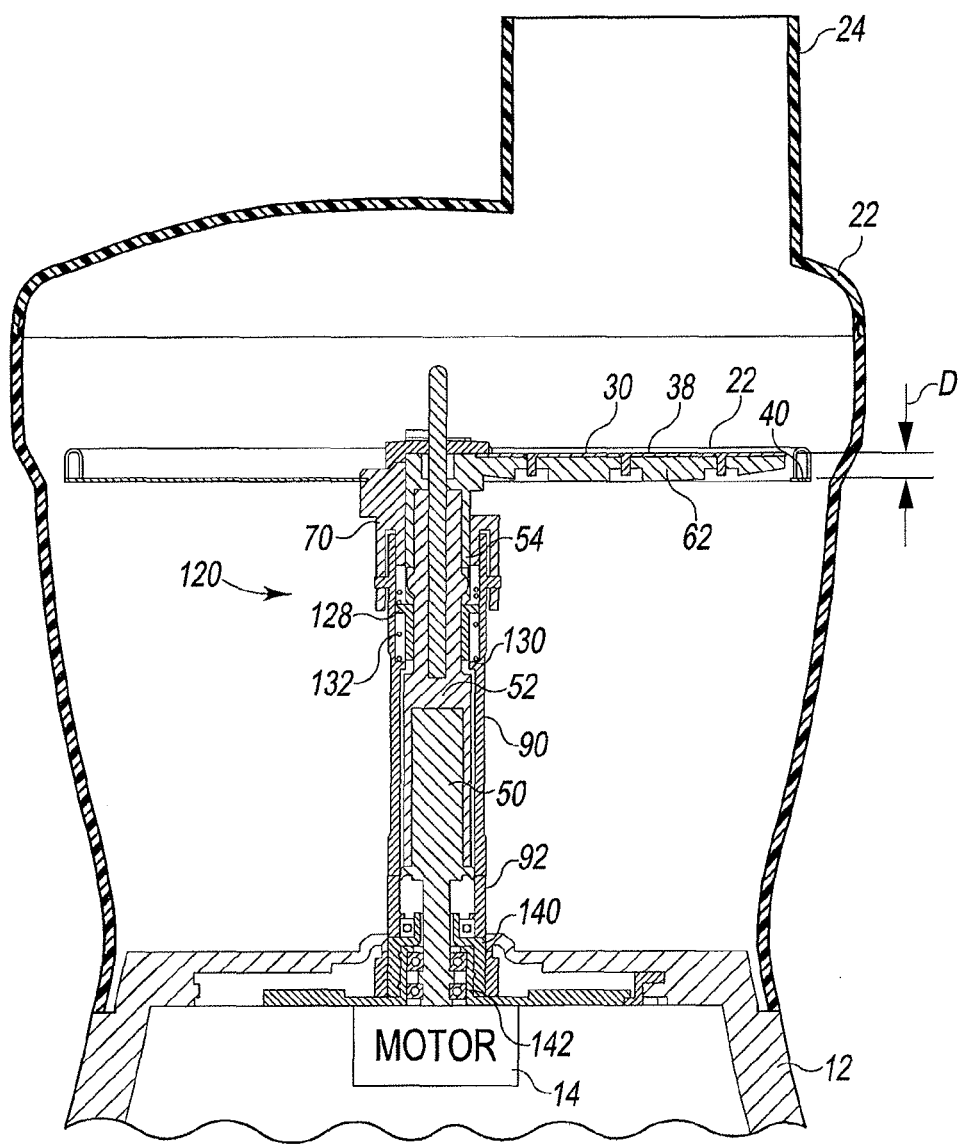
FIG. 4 is a view similar to FIG. 3 showing the rotating disk in another position relative to the cutting blade.

Referring now to FIGS. 2-4, the motor 14 includes an output shaft 50 extending upwardly from the base 12. The output shaft 50 is coupled to a drive stem 52, which is in turn coupled to a central shaft 54 of a blade assembly 56 of the cutting assembly 16. The central shaft 54 has a socket 58 formed in its lower end. A pair of tabs 60 extending from the upper end of the drive stem 52 is received in the socket 58, thereby coupling the drive stem 52 (and hence the output shaft 50 of the motor 14) to the central shaft 54 of the blade assembly 56. As such, rotation of the output shaft 50 causes rotation of the blade assembly 56. It should be appreciated that the position of the socket and the tabs may be reversed with the tabs being formed in the central shaft 54 and the socket being formed on the drive stem 52.

The blade assembly 56 also includes a mounting arm 62 that extends outwardly from the central shaft 54. The cutting blade 30 is secured to the upper surface of the mounting arm 62. In the exemplary embodiment, the central shaft 54 and the mounting arm 62 are formed from a metallic material as a single monolithic component. It should be appreciated that in other embodiments the shaft 54 and the arm 62 may be formed as separate components, which are then joined together during final assembly by an adhesive or other suitable fastener.

A number of fasteners 64 (i.e., screws) positioned at a rear edge 66 of the cutting blade 30 extend into the mounting arm 62, thereby rigidly securing the cutting blade 30 to the mounting arm 62. It will be appreciated that in other embodiments the fasteners 64 may take the form of T-stakes, pins, posts, or other structures capable of securing the cutting blade 30 to the arm 62. As best seen in FIG. 2, the arm 62 includes an overmold 68 that receives the cutting blade 30.

The rotating disk 32 includes a central hub 70, a planar body 72 extending radially outward the central hub 70, and a rim 74 extending upwardly from the outer perimeter of the planar body 72. The rotating disk 32 has a diameter that is slightly less than the inner diameter of the bowl 20 such that the rim 74 is positioned adjacent to, but is slightly spaced apart from, the inner wall of the bowl to permit rotation of the disk 32 within the bowl 20. In the exemplary embodiment described herein, the planar body 72 and the rim 74 are embodied as a monolithic structure (e.g., a single molded or cast part). However, it should be appreciated that all of the components of the rotating disk 32 (e.g., hub 70, body 72, and rim 74) may be integrated into a single monolithic structure or may be formed as separate components secured to one another by an adhesive or other suitable fastener.

The hub 70 of the rotating disk 32 has a sidewall 76 that defines a passageway 78 extending through the hub 70. The central shaft 54 of the blade assembly 56 is positioned in the passageway 78. The hub 70 also has a pocket 80 defined in the sidewall 76 that opens into the passageway 78. The mounting arm 62 of the blade assembly 56 is received in the pocket 80, thereby torsionally securing the blade assembly 56 to the rotating disk 32. As such, rotation of the blade assembly 56 by the output shaft 50 causes rotation of the rotating disk 32.

The mounting arm 62 extends outwardly from the pocket 80 and is positioned in an oblong opening 82 formed in the rotating disk 32. The rotating disk 32 is permitted to vertically slide relative to the mounting arm 62 and the blade 30. In use, when the cutting thickness is adjusted, the rotating disk 32 slides upwardly or downwardly relative to the blade assembly 56 (e.g., cutting blade 30). Because the blade assembly 56 is fixed to the drive stem 52, the cutting blade 30 is maintained in its vertical position such that, as the rotating disk 32 moves upwardly or downwardly, the distance D defined between the cutting edge 38 of the cutting blade 30 and the upper surface 40 of the rotating disk 32 changes, thereby changing the cutting thickness. As seen in FIG. 3, the distance D defined between the cutting edge 38 of the cutting blade 30 and the upper surface 40 of the rotating disk 32 is relatively small, resulting in thinner slices. Oppositely, as shown in FIG. 4, the distance D defined between the cutting edge 38 of the cutting blade 30 and the upper surface 40 of the rotating disk 32 is larger because the rotating disk 32 has moved downward relative to the cutting blade 30, which results in thicker slices.

As described above, the food processor 10 includes the thickness adjustment assembly 42, which is operable to move the rotating disk 32 relative to the cutting blade 30. The adjustment assembly 42 includes a two-piece adaptor 84 coupled to the hub 70 of the rotating disk 32, a lift device 86 supporting the adaptor 84 and the rotating disk 32, and a gear assembly 88 positioned in the base 12. The adaptor 84 includes an upper shaft 90 secured to the hub 70 of the rotating disk 32 and a lower shaft 92 rotatively coupled to the lift device 86. The upper shaft 90 has a cylindrical body 94 that extends from an upper end 96 to a lower end 98. The upper end 96 of the upper shaft 90 has a pair of tabs 100 extending outwardly therefrom. Each tab 100 is positioned in a corresponding slot 102 defined in the hub 70, thereby securing the shaft 90 to the rotating disk 32 such that rotation of the rotating disk 32 causes rotation of the shaft 90. At the lower end 98 of the shaft 90, a plurality of teeth 110 are formed in the body 94 to secure the upper shaft 90 to the lower shaft 92, as described in greater detail below.

The shaft 90 of the adaptor 84 also includes an opening 104 that is defined in the upper end 96 of the cylindrical body 94. The body 94 includes an inner wall 106 extending downwardly from the opening 104 and defining a passageway 108 through the body 94. When assembled, the shaft 90 is positioned over the drive stem 52 and the lower end of the central shaft 54 of the blade assembly 56 such that the stem 52 and shaft 54 are received in the passageway 108.

The lower shaft 92 of the adaptor 84 is torsionally secured to the lower end 98 of the shaft 90 such that the rotation of the shaft 90 causes rotation of the shaft 92. The lower shaft 92, like the upper shaft 90, has a cylindrical body 112 extending from an upper end 114 to a lower end 116. The body 112 includes a plurality of teeth 118, which are formed at the upper end 114. When the adaptor 84 is assembled, the teeth 118 of the lower shaft 92 are interdigitated with the teeth 110 of the upper shaft 90, thereby securing the shafts 90, 92 together. It will be appreciated that in other embodiments a combination of pins and slots as well as other fastening means may be used to torsionally secure the shafts 90 to the shaft 92.

As shown in FIGS. 3-4, the shaft 90 includes a biasing mechanism 120 positioned in the passageway 108, and the biasing mechanism 120 is configured to bias the upper shaft 90 into engagement with the lower shaft 92. The biasing mechanism 120 includes a sleeve 122 positioned in the middle of the passageway 108. The sleeve 122 has the drive stem 52 of the motor 14 extending therethough.

The sleeve 122 includes an upper rim 124 that contacts the lower surface 126 of the central shaft 54 of the blade assembly 56 when the upper shaft 90 is secured to the rotating disk 32. A flange 128 extends outwardly from the upper rim 124. Similarly, the inner wall 106 of the upper shaft 90 includes an inner flange 130 extending inwardly into the passageway 108. A biasing element, such as a spring 132, is positioned between the flanges 128, 130. The spring 132 urges the shaft 90 downward to maintain engagement between the teeth 110, 118 such that the shafts 90, 92 remain coupled together.

The lift device 86 is operable to move the adaptor 84 (and hence rotating disk 32) upwardly and downwardly relative to the base. The lift device 86 includes a screw-type drive assembly having an internally-threaded upper sleeve 140 and an externally-threaded lower sleeve 142. The internal threads 144 of the upper sleeve 140 threadingly engage the external threads 146 of the lower sleeve 142 to move the upper sleeve 140 upwardly and downwardly relative to the base 12. For example, counter-clockwise rotation of the upper sleeve 140 may cause downward movement of the upper sleeve 140, while clockwise rotation of the upper sleeve 140 may cause upward movement of the upper sleeve 140.

The lower end 116 of the shaft 92 of the adaptor 84 is rotatively coupled to the upper sleeve 140 of the lift device 86 via a bearing 148. In that way, the shaft 92 (and hence cutting assembly 16) is permitted to rotate relative to the upper sleeve 140. At the same time, the bearing 148 fixes the axial position of the shaft 92 relative to the upper sleeve 140 such that upward and downward movement of the upper sleeve 140 causes upward and downward movement of the shaft 92.

In use, the thickness of food items being processed by the food processor 10 changes as the upper sleeve 140 translates upwardly and downwardly because the adaptor 84 moves with the upper sleeve 140. In particular, as the upper sleeve 140 moves downwardly along the lower sleeve 142, the lower shaft 92 of the adaptor 84 moves downwardly with the upper sleeve 140. The spring 132 within the upper shaft 90 urges the upper shaft 90 to move downwardly with the lower shaft 92. Because the upper shaft 90 is secured to the hub 70 of the rotating disk 32, that vertical movement of the upper shaft 90 of the adaptor 84 causes vertical movement of the rotating disk 32 relative to the cutting blade 30. As such, when the upper sleeve 140 is moved downwardly, the rotating disk 32 is moved downwardly, and the distance D between the cutting edge 38 of the cutting blade 30 and the upper surface 40 of the rotating disk 32 is increased, thereby producing thicker pieces of food items. Oppositely, as the upper sleeve 140 translates upwardly along the lower sleeve 142, the rotating disk 32 moves upwardly, and the distance D between the cutting edge 38 of the cutting blade 30 and the upper surface 40 of the rotating disk 32 decreases, thereby producing thinner pieces of food items.

While the lift device 86 is operable to change the vertical position of the rotating disk 32, the lift device 86 is isolated from the rotational force of the motor 14 such that the lift device 86 is not driven along with the cutting assembly 16. As described above, the adaptor 84, which rotates with the cutting assembly 16, is rotatively coupled to the upper sleeve 140 via the bearing 148. Additionally, in the illustrative embodiment, the upper sleeve 140 has a hollow passageway 150 extending therethrough. The output shaft 50 of the motor 14 is positioned in the hollow passageway 150, and the hollow passageway 150 is sized such that the output shaft 50 is spaced apart from the upper sleeve 140. The output shaft 50 is rotatively coupled to the lower sleeve 142 via a pair of bearings 152 such that the output shaft 50 is permitted to rotate relative to the lower sleeve 142. As such, rotational force from the output shaft 50 is not transmitted to the sleeves 140, 142 of the lift device 86.

The lower sleeve 142 is secured to the base 12 such that the sleeve 142 does not rotate. The base 12 has a compartment 160 that is defined by an outer wall 162. A platform 164 is positioned within the compartment 160, and the lower sleeve 142 is secured to the platform 164. As best seen in FIG. 2, the gear assembly 88 is also positioned within the compartment 160. The gear assembly 88 includes a drive gear 170 and a guide gear 172 that are pivotally coupled to the platform 164. Each of the gears 170, 172 is an external gear having a plurality of teeth 174, 176 defined on an outer surface 178, 180 thereof. The teeth 174, 176 are interdigitated such that rotation of the drive gear 170 causes rotation of the guide gear 172.

Figure 5:
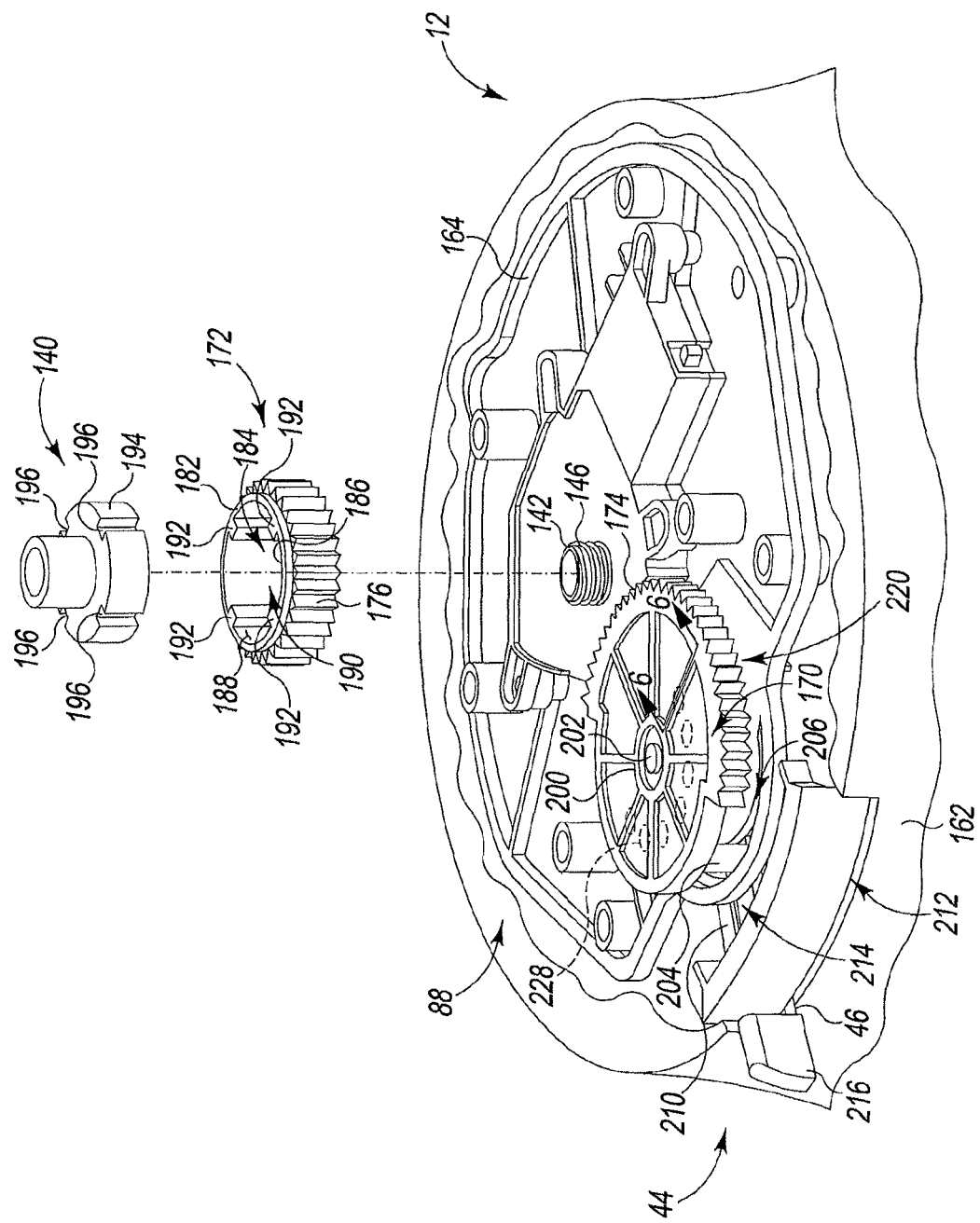
FIG. 5 is an exploded, partial cross-sectional perspective view of the base of the food processor of FIG. 1.

As best seen in FIG. 5, the guide gear 172 has a body 182 configured to be rotatively coupled to the platform 164. The body 182 includes an opening 184 defined in an upper surface 186 and an inner wall 188 extending downwardly from the opening 184. The inner wall 188 defines a passageway 190 extending through the body 182 of the gear 172. A plurality of splines 192 extend inwardly from the inner wall 188 into the passageway 190.

The upper sleeve 140 of the lift device 86 moveably coupled to the guide gear 172. The upper sleeve 140 includes an outer surface 194 having a plurality of grooves 196 defined therein. Each groove 196 is sized to receive one of the splines 192 of the gear 172, thereby coupling the sleeve 140 to the guide gear 172 and permitting the sleeve 140 to translate upwardly and downwardly relative to the gear 172. As such, rotation of the guide gear 172 causes rotation of the upper sleeve 140 relative to the lower sleeve 142. As described above, rotation of the upper sleeve 140 causes movement of the upper sleeve 140 upwardly or downwardly and changes the thickness of food items being processed by the food processor 10.

As best seen in FIG. 5, the drive gear 170 includes a body 200 that is positioned in the compartment 160 of the base 12. The body 200 is pivotally coupled to a platform 164 of the base 12 via a pivot pin 202. The drive gear 170 includes a shaft 204 that extends downwardly from the body 200. The shaft 204 is extends through a curved slot 206 defined in the platform 164.

The external control device 44 is configured to operate the lift device 86 and the gear assembly 88 to move the rotating disk 32 upwardly and downwardly and thereby change the thickness of food items processed by the food processor 10. The control lever 46 of the external control device 44 is coupled to the drive gear 170. The lever 46 includes an arm 210 having a guide slot 214 defined therein. The shaft 204 of the gear 170 is positioned in the guide slot 214, thereby coupling the lever 46 to the gear 170.

The arm 210 extends outwardly through a horizontal track 212 defined in the outer wall 162 of the base 12. A grip 216 of the user-operated device 44 is secured at the end of the arm 210 positioned outside the base 12. When the food processor is assembled, the grip 216 is positioned below the removable bowl 20. The arm 210, like the drive gear 170, is pivotally coupled to the platform 164 such that the grip 216 is moveable between a plurality of adjustment positions relative to the base 12.

In use, movement of the grip 216 of the control lever 46 relative to the base 12 causes the arm 210 to pivot and advance the shaft 204 of the gear 170 along the slot 206. As the shaft 204 advances along the slot 206, the drive gear 170 and guide gear 172 rotate. As described above, rotation of the guide gear 172 causes movement of the upper sleeve 140 upwardly or downwardly and changes the thickness of food items being processed by the food processor 10. Each adjustment position of the grip 216 corresponds to one of the preset cutting positions of the cutting assembly 16.

Figure 6:
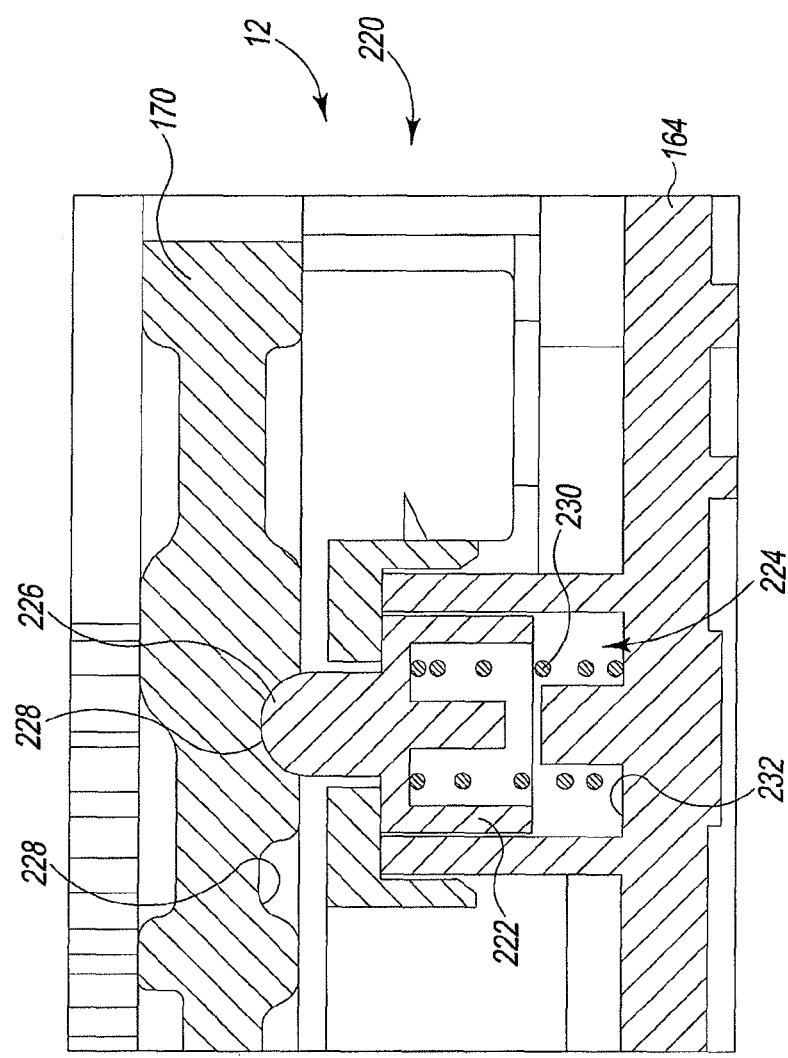
FIG. 6 is a partial cross-sectional view of the base of the food processor of FIG. 1 taken along the line 6-6 of FIG. 5.

Referring now to FIGS. 5 and 6, the food processor 10 includes a locking mechanism 220 configured to inhibit movement of the control lever 46 relative to the base 12 and thereby maintain the cutting assembly 16 at its current cutting position. The locking mechanism 220 includes a pin 222 positioned in an aperture 224 defined in the platform 164. The convex upper end 226 of the pin 222 is configured to be received in a plurality of concave notches 228 defined in the bottom surface of the body 200 of the drive gear 170. Each notch 228 corresponds to an adjustment position of the control lever 46 and hence a cutting position of the cutting assembly 16.

As shown in FIG. 6, a biasing element, such as spring 230, is positioned between the pin 222 and the bottom surface 232 of the aperture 224. The spring 230 urges the pin 222 into engagement with the notch 228 corresponding to the present adjustment position of the control lever 46. However, when the user desires to change the thickness of the food items being processed by the food processor 10, the user may grab the grip 216 and advance the control lever 46 along the track 212. Doing so moves the convex pin 222 along the concave surface of the notch 228 and overcomes the bias of the spring 230, thereby moving the pin 222 downward and permitting the pin 222 to slide along the bottom surface of the gear 170 to the next notch 228 corresponding to the next adjustment position.

In use, a user operates the controls 18 to energize the motor 14 to rotate the output shaft 50 and the drive stem 52. Because the cutting assembly 16 is secured the drive stem 52 via the central shaft 54, rotation of the output shaft 50 causes rotation of the cutting assembly 16. While the motor 14 is energized, the user may advance food items into the processing chamber 26 through the feed tube 24 to be cut by the rotating cutting assembly 16.

If the user desires to change the cutting thickness during the cutting operation, the user may grab the grip 216 and advance the control lever 46 along the track 212 to another adjustment position. Movement of the control lever 46 causes the control lever 46 to pivot and rotate the drive gear 170 and guide gear 172. As described above, rotation of the guide gear 172 causes rotation of the upper sleeve 140 relative to the lower sleeve 142 and moves the upper sleeve 140 upwardly or downwardly relative to the base 12. Because the adaptor 84 is secured to both the upper sleeve 140 and the rotating disk 32, movement of the upper sleeve 140 causes movement of the disk 32 relative to the cutting blade 30, thereby changing the distance D between the cutting edge 38 of the cutting blade 30 and the upper surface 40 of the rotating disk 32 and, consequently, the thickness of food items being processed by the food processor 10.

Figure 7:
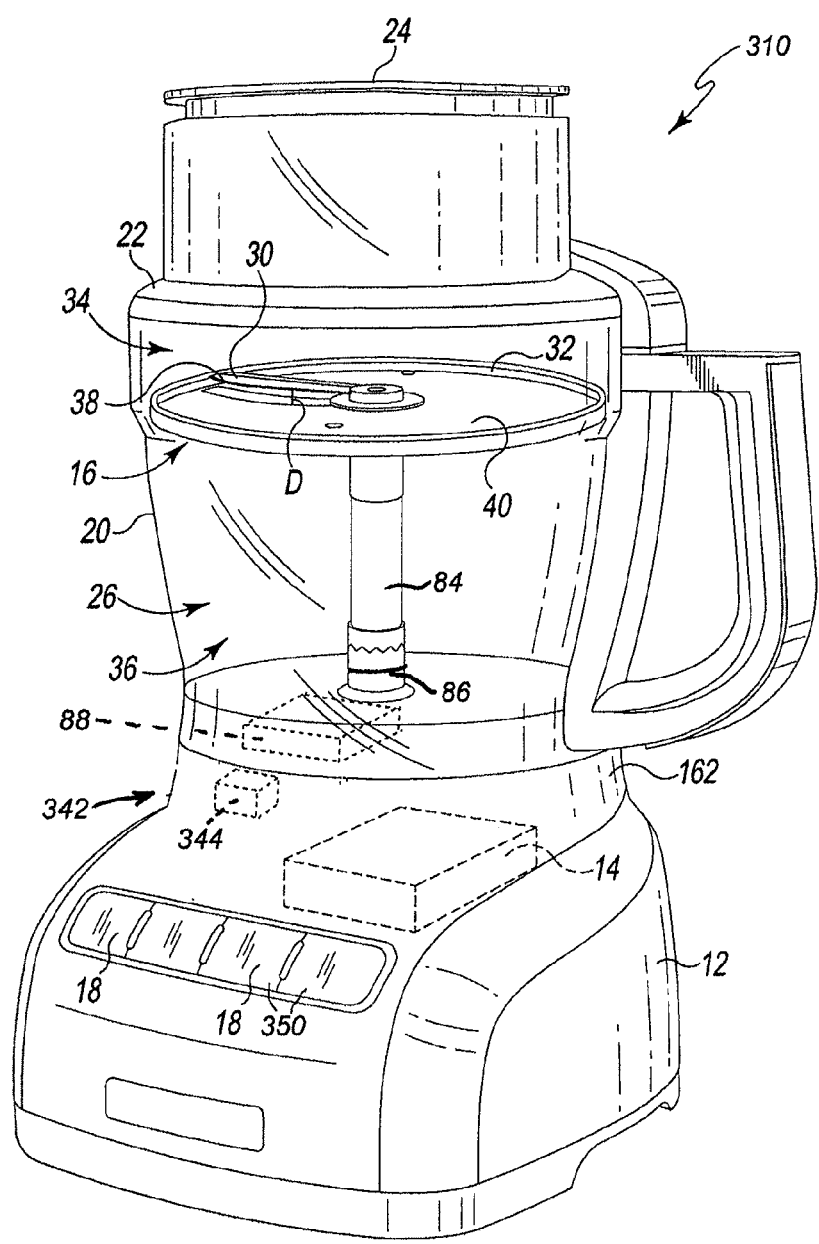
FIG. 7 is a perspective view of another embodiment of a food processor.

Referring now to FIG. 7, another embodiment of a food processor (hereinafter referenced as a food processor 310) is shown. Some features of the embodiment illustrated in FIG. 7 are substantially similar to those discussed above in reference to the embodiment of FIGS. 1-6. Such features are designated in FIG. 7 with the same reference numbers as those used in FIGS. 1-6.

The food processor 310 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 310. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 310) and provide electrical control signals to the motor or other components of the food processor 310. For example, the control unit may be embodied as a microcontroller that executes firmware routines to control the operation of the food processor 310.

The food processor 310 also includes a removable receptacle or bowl 20 secured to the base 12, and the bowl 20 has a removable lid 22 secured to its upper peripheral edge. Collectively, the lid 22 and the bowl 20 define a processing chamber 26 where food items are processed by the cutting assembly 16.

As shown in FIG. 7, the cutting assembly 16 includes a cutting blade 30 and a rotating disk 32. A vertical distance, D, between the cutting edge 38 of the cutting blade 30 and the upper surface 40 of the rotating disk 32 defines a cutting thickness of food items processed by the cutting assembly 16. In other words, the thickness of the pieces of food items cut by the food processor 10 is determined by the distance D between the cutting edge 38 of the cutting blade 30 and the upper surface 40 of the rotating disk 32.

The food processor 310 also includes a thickness adjustment assembly 342, which is operable by a user to vary the cutting thickness of the food processor 10 while the cutting assembly 16 is driven by the motor 14, thereby creating thicker or thinner pieces of cut food items during a cutting operation. Like the thickness adjustment assembly 42 of the embodiment of FIGS. 1-6, the thickness adjustment assembly 342 includes a two-piece adaptor 84 coupled to the rotating disk 32, a lift device 86 supporting the adaptor 84 and the rotating disk 32, and a gear assembly 88 positioned in the base 12. The thickness adjustment assembly 342 also includes a motor 344 (shown in diagrammatic form) that is coupled to the gear assembly 88 and operable to rotate the drive gear 170 and guide gear 172 of the gear assembly 88 and thereby raise and lower the rotating disk 32 relative to the cutting blade 30. A user operates a pair of buttons 350 of the controls 18 to control the operation of the motor 344 and hence the thickness adjustment assembly 42. In that way, the motor 344 and buttons 350 replace the control lever 46 as the mechanism by which the gear assembly 88 and lift device 86 are operated to change the thickness of the processed food items.

In other embodiments, the adjustment assembly may include other electromechanical components such that the user may adjust the cutting thickness at the touch of a button while the cutting assembly 16 is driven by the motor 14. The electromechanical components may include, for example, a small motor that would directly operate a screw-type drive assembly without a gear assembly while the other motor drives the cutting assembly. The electromechanical components may also include control circuitry to process electrical signals received from the second motor and provide electrical control signals to the second motor. For example, the control circuitry may be embodied as a microcontroller that executes firmware routines to control the operation the second motor to adjust the cutting thickness of the cutting assembly. Additional controls or buttons to control the operation of the second motor may be added to the food processor.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food choppers, slicers, dicers, ice shavers and the like. Additionally, while the cutting assembly 16 was illustratively embodied as an adjustable slicing disk attachment, the concept of an adjustable cutting assembly 16 can also be implemented with other cutting attachments, such as, for example, a shedding disk, grate/shaving disk, julienne disk, and the like.

It will also be appreciated that in other embodiments the threaded sleeves 140, 142 of the lift device 86 may be replaced with a series of ramp structures or cams that slide relative to one another to change the position of the rotating disk 32 relative to the cutting blade 30. Additionally, it will also be appreciated that in other embodiments the rotating disk may be vertically fixed and the cutting blade may be configured to move relative to the rotating disk to change the cutting thickness.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
a base having a motor positioned therein,
a removable bowl coupled to the base,
a removable lid coupled to the bowl so as to define a processing chamber, the lid having a feed tube that opens into the bowl,
a cutting assembly positioned in the processing chamber and driven by the motor to cut food items advanced through the feed tube, the cutting assembly being positionable between a plurality of cutting positions to produce cut food items of varying thicknesses, and
an adjustment assembly positioned in the base, comprising (i) a first sleeve secured to the base, (ii) a second sleeve rotatively coupled to the first sleeve, and (iii) a user-operated external control device positioned at least partially outside the removable bowl operable to rotate the second sleeve relative to the first sleeve to move the cutting assembly between the plurality of cutting positions.

2. The food processor of claim 1, wherein the first sleeve has an externally-threaded body, and the second sleeve has an internally-threaded body positioned over the externally-threaded body of the first sleeve.

3. The food processor of claim 2, wherein:
the cutting assembly comprises a cutting blade and a rotating disk, the rotating disk being supported by the second sleeve, and
rotation of the second sleeve in a first direction causes upward movement of the second sleeve and the rotating disk relative to the cutting blade, and rotation of the second sleeve in a second direction causes downward movement of the second sleeve and the rotating disk relative to the cutting blade.

4. The food processor of claim 3, further comprising:
a drive shaft connected at a first end to the motor and at a second end to the cutting assembly to transmit a driving force from the motor to the cutting assembly, and
wherein (i) the first sleeve includes a bearing rotatively supporting the drive shaft, and (ii) the drive shaft extends through an opening defined in the second sleeve, the opening being sized such that the drive shaft does not contact the second sleeve.

5. The food processor of claim 4, further comprising a first adaptor removeably coupled to the rotating disk, and a second adaptor secured to a lower end of the first adaptor, wherein the second sleeve includes a bearing rotatively supporting the second adaptor.

6. The food processor of claim 5, wherein the lower end of the first adaptor includes a first plurality of teeth, and the second adaptor includes a second plurality of teeth interdigitated with the first plurality of teeth to secure the second adaptor to the first adaptor.

7. The food processor of claim 1, wherein the adjustment assembly further comprises:
a gear assembly positioned in the base and coupled to the second sleeve, the gear assembly being operable to rotate the second sleeve relative to the first sleeve, and
wherein the user-operated control device is coupled to the gear assembly and is configured to operate the gear assembly such that the second sleeve is rotated relative to the first sleeve to move the cutting assembly between the plurality of cutting positions.

8. The food processor of claim 7, wherein the second sleeve has a groove defined therein, and the gear assembly comprises (i) a first gear including a first plurality of teeth defined on an outer surface and a spline extending from an inner surface, the spline being received in the groove of the second sleeve, and (ii) a second gear including a second plurality of teeth interdigitated with the first plurality of teeth, wherein the user-operated control device causes rotation of the second gear and the first gear.

9. The food processor of claim 8, wherein the user-operated control device includes a lever extending outwardly from the base and positionable between a plurality of adjustment positions relative to the base, the lever being coupled to the second gear such that movement of the lever between the plurality of adjustment positions device causes rotation of the second sleeve relative to the first sleeve to move the cutting assembly between the plurality of cutting positions.

10. The food processor of claim 9, further comprising a locking mechanism to inhibit movement of the lever.

11. The food processor of claim 10, wherein the locking mechanism comprises:
a plurality of notches formed in the second gear, each notch corresponding to one of the plurality of adjustment positions,
a pin positioned below the second gear, the pin being configured to be received in each of the plurality of notches, and
a spring coupled to the pin, the spring biasing the pin into the notch corresponding to a present adjustment position of the lever to inhibit movement of the lever.

12. A food processor comprising:
a base having a motor positioned therein,
a removable bowl coupled to the base,
a removable lid coupled to the bowl so as to define a processing chamber, the lid having a feed tube that opens into the bowl,
a cutting assembly positioned in the processing chamber and driven by the motor to cut food items advanced through the feed tube, the cutting assembly including a cutting blade and a rotating disk having an upper surface, the rotating disk being upwardly and downwardly moveable relative to the cutting blade to adjust the distance between the upper surface of the rotating disk and the cutting blade, and
an adjustment assembly including a screw-type drive assembly positioned in the base and an external user-operated control device positioned at least partially outside the removable bowl, the screw-type drive assembly being operable to move the rotating disk relative to the cutting blade while the rotating disk and the cutting assembly is driven by the motor upon movement of the external user-operated control device.

13. The food processor of claim 12, wherein:
the screw-type drive assembly supports the rotating disk, and
rotation of the screw-type drive assembly in a first direction causes upward movement of the rotating disk, and rotation of the screw-type drive assembly in a second direction causes downward movement of the rotating disk.

14. The food processor of claim 13, wherein:
the screw-type drive assembly comprises an externally-threaded first sleeve and an internally-threaded second sleeve positioned over the first sleeve,
the rotating disk is supported by the second sleeve, and
rotation of the second sleeve in the first direction causes upward movement of the second sleeve and the rotating disk, and rotation of the second sleeve in the second direction causes downward movement of the second sleeve and the rotating disk.

15. The food processor of claim 14, wherein the adjustment assembly further comprises a gear assembly positioned in the base and coupled to the second sleeve, the gear assembly being configured to rotate the second sleeve relative to the first sleeve.

16. The food processor of claim 12, wherein:
the adjustment assembly further comprises a lever coupled to the screw-type drive assembly, the lever extending outwardly from the base and being moveable relative to the base, and
movement of the lever causes the screw-type drive assembly to move the rotating disk relative to the cutting blade.

17. The food processor of claim 16, further comprising a locking mechanism to inhibit movement of the lever.

18. A food processor comprising:
a base having a motor positioned therein,
a removable bowl coupled to the base,
a removable lid coupled to the bowl so as to define a processing chamber, the lid having a feed tube that opens into the bowl,
a cutting assembly positioned in the processing chamber and driven by the motor to cut food items advanced through the feed tube, the cutting assembly including a cutting blade and a rotating support, the rotating support being positionable relative to the cutting blade between a plurality of cutting positions to produce cut food items of varying thicknesses, and
an adjustment assembly positioned in the base, the adjustment assembly including an external control device positioned at least partially outside the removable bowl, wherein the adjustment assembly is operable to move the rotating support of the cutting assembly between the plurality of cutting positions relative to the cutting blade while the cutting assembly is driven by the motor upon movement of the external user-operated control device.

19. The food processor of claim 18, wherein:
the rotating support comprises a rotating disk; and
the adjustment assembly comprises a lever extending outwardly from the base, the lever being positionable between a plurality of adjustment positions corresponding to the plurality of cutting positions of the cutting assembly such that movement of the lever between the plurality of adjustment positions moves the cutting assembly between the plurality of cutting positions.

20. A food processor comprising:
a base having a motor positioned therein,
a removable bowl coupled to the base, a removable lid coupled to the bowl so as to define a processing chamber, the lid having a feed tube that opens into the bowl, a cutting assembly positioned in the processing chamber and driven by the motor to cut food items advanced through the feed tube, the cutting assembly being positionable between a plurality of cutting positions to produce cut food items of varying thicknesses, and an adjustment assembly positioned in the base, the adjustment assembly including an external control device positioned at least partially outside the removable bowl, wherein the adjustment assembly is operable to move the cutting assembly between the plurality of cutting positions while the cutting assembly is driven by the motor upon movement of the external user-operated control device;

a screw-type drive assembly operable to move the cutting assembly between the plurality of cutting positions, and a second motor rotatively coupled to the screw-type drive assembly, the second motor being configured to operate the screw-type drive assembly to move the cutting assembly between the plurality of cutting positions when the second motor is energized.

\* \* \* \* \*